March 25, 1952     C. VOLZ     2,590,483
TRACK CIRCUIT APPARATUS USING ALTERNATING CURRENT
Filed Dec. 20, 1946
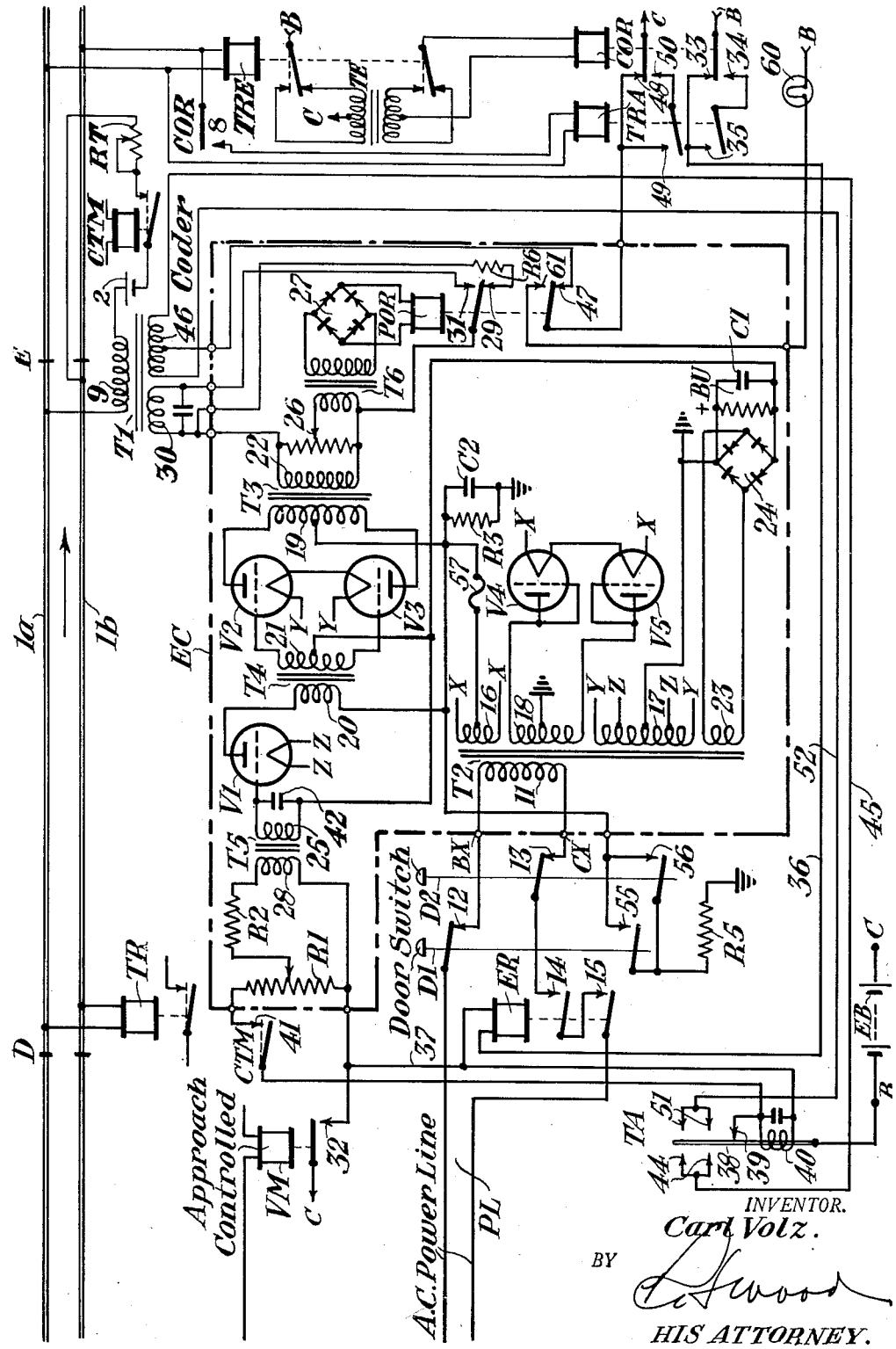
INVENTOR.
Carl Volz.
BY
HIS ATTORNEY.

Patented Mar. 25, 1952

2,590,483

UNITED STATES PATENT OFFICE 2,590,483

TRACK CIRCUIT APPARATUS USING ALTERNATING CURRENT

Carl Volz, Pittsburgh, Pa., assignor to Westinghouse Air Brake Company, a corporation of Pennsylvania Application December 20, 1946, Serial No. 717,482

13 Claims. (Cl. 246—34)

My invention relates to track circuit apparatus, and more particularly to track circuit apparatus which uses alternating current.

In track circuit apparatus using alternating current, the alternating current is preferably of a frequency special for the track circuit so that interference from propulsion current and from commercial alternating current sources is avoided. Current of a special frequency for track circuits is often obtained by use of a converter operable to convert direct current or commercial frequency alternating current into current of the desired special frequency. These converters are often located one at each track circuit and powered from a local battery or from a commercial power line. A tuned alternator with associated transformer and circuits are a satisfactory form of such converter, although the wear and burning of the contacts of a tuned alternator may require frequent renewals and careful maintenance. In multiple track railways, a single converter to feed two or more adjacent track circuits is in the interest of economy and in such an arrangement the wear and burning of the tuned alternator contacts are greater due to the larger load and they may become a serious problem.

Accordingly, a feature of my invention is the provision of apparatus incorporating novel and improved means for supplying alternating current of a distinctive or special frequency.

Another feature of my invention is the provision of track circuit apparatus incorporating a novel frequency converter which can be approach controlled to minimize the power required.

Again, a feature of my invention is the provision of track circuit apparatus having a frequency converter which minimizes the period during which the contacts of an associated tuned alternator carry current.

Another feature of my invention is the provision of track circuit apparatus of the type here involved incorporating an improved circuit arrangement to minimize the danger of shock to a maintainer from the high voltage circuits.

Other features, objects and advantages of my invention will appear as the specification progresses.

I accomplish the foregoing features, objects and advantages of my invention by using a tuned alternator for monitoring a pair of vacuum tubes which in turn handle the relatively large current supplied to the track circuit. The excitation of the tubes is governed by the tuned alternator and at a rate corresponding to the operating frequency of the tuned alternator, and in this way the output of the tubes can be made to supply an alternating current of a desired frequency by adjustment of the tuned alternator. The excitation of the tubes is obtained from the operating winding of the tuned alternator, and this leaves the alternator contacts free for other use. Power from a commercial power line is rectified and the rectified current applied to the tubes for use in the track circuit under the ordinary conditions. A stand-by battery is provided to take over the load in case of a loss of power on the commercial power line. The stand-by battery is connected to the track circuit through the contacts of the tuned alternator and a transformer so that current from the battery is converted into alternating current of the specified frequency.

The electron tubes of the frequency converter are preferably all of the same type for convenience of maintenance, and they are of the type characterized by quick heating of their filaments. Thus, the electron tubes may be completely approach controlled or approach energized and thereby minimize the energy consumed. Also, greater efficiency is obtained by biasing the tubes to substantially their cutoff point.

Door switches for the door of the housing of the apparatus are provided for the safety of the maintainer. Each door switch has independent front and back contacts, one to open the high voltage connection to the commercial power line and the other to discharge a filter condenser. The arrangement is such that in the event a door switch fails to open when the door is removed, the circuit by which power is supplied to the tubes from the rectifier is short circuited to blow a fuse and in this way disconnect the high anode voltage.

I shall describe one form of apparatus embodying my invention, and shall then point out the novel features thereof in claims.

In the accompanying drawing which is a diagrammatic view showing a preferred form of track circuit apparatus embodying my invention, the reference characters 1a and 1b designate the track rails of a railway track over which traffic normally moves in the direction indicated by an arrow and which rails are formed in the usual manner with a track section D—E, and which section may be one section of a series of sections of a signal system.

The track section D—E is formed with a track circuit which includes a source of power connected across the rails at the exit end E of the section and a track relay TR connected across the rails at the entrance end D of the section.

The normal source of track circuit current includes a battery 2, one terminal of which is connected to rail 1b through a contact 10 of a coder CTM and a resistor RT, and the other terminal of which battery is connected to rail 1a through secondary winding 9 of a track transformer T1 to be referred to later. The coder CTM may be of any of the known forms suitable for track circuits and it is continuously operated by power from a convenient source, not shown. It follows that pulses of direct current are supplied from battery 2 to the track circuit, the pulses being of a code rate corresponding to the rate of operation of the coder CTM. The track relay TR is a code following type and is operated by the code pulses. The relay TR is used to control wayside signals and other devices but such control and devices are not shown since they may be of standard arrangement and form no part of this invention which is primarily directed to apparatus for superimposing on the track circuit of section D—E an alternating current suitable for governing cab signals of a train traversing the section.

The originating source of power for the alternating track circuit current is either a commercial alternating current power line PL or a stand-by battery EB. Ordinarily current is taken from the commercial power line PL and the current converted into an alternating current of a special frequency for the track circuit. The alternating current of the commercial power line may be of standard frequency of 60 cycles per second and the track circuit current may be of a special frequency of the order of 100 cycles per second but it is to be understood that other frequencies can be used. Ordinarily, the battery EB is used to supply only control current and current for operating a tuned alternator to be referred to later. In the event of a loss of power on the power line PL, the battery EB supplies the energy for the alternating track circuit current, the current supplied from the battery being converted into alternating current of 100 cycles per second for the track circuit by the tuned alternator.

The apparatus comprises as essential elements an electronic frequency converter indicated as a whole by the reference character EC, a tuned alternator TA, an approach controlled relay VM, a control relay ER, traffic controlled relays TRA and COR, door switches D1 and D2 and the track transformer T1.

The power line PL is connected to terminals BX and CX of the unit EC, through front or normally closed contacts 12 and 13 of door switches D1 and D2, respectively, and front contacts 14 and 15 of control relay ER; and the terminals BX and CX are in turn connected to primary winding 11 of a power transformer T2 of the unit EC. The transformer T2 is provided with secondary windings, certain ones of which are connected to the filament circuits of the different electron tubes of the unit EC, a secondary winding 16 being connected to the filaments of rectifier tubes V4 and V5, as indicated at X—X, and a secondary winding 17 having its outside terminals indicated at Y—Y connected to the filaments of converter tubes V2 and V3, and intermediate terminals indicated at Z—Z connected to the filament of a driver tube V1.

The electron tubes V1 to V5, inclusive, are preferably alike so that only the one type of tube is needed for replacements. These tubes may be of any one of several different types and are shown as triodes which are characterized by being heated and brought to an active condition quickly. The two triodes V4 and V5 are used as rectifiers by connecting their anodes and grids together. The output of the rectifier tubes V4 and V5 is used to power the anode circuits of the driver tube V1 and converter tubes V2 and V3. Specifically, the anodes of the rectifier tubes are connected across a secondary winding 18 of transformer T2, a mid terminal of which secondary winding is grounded. A mid terminal of secondary winding 16, across the outside terminals X—X of which winding the filaments of the rectifier tubes V4 and V5 are connected, is connected to the anode of driver tube V1 through a primary winding 20 of a coupling transformer T4. The filament of tube V1 is in turn connected to terminals Z—Z of secondary winding 17, a mid terminal of which winding 17 is connected through ground to the mid terminal of secondary winding 18. Similarly, the mid terminal of secondary winding 16 is connected to the anodes of the converter tubes V2 and V3 through the two half portions in multiple of primary winding 19 of an output transformer T3, while the filaments of the tubes V2 and V3 are connected to terminals Y—Y of secondary winding 17 the mid terminal of which is connected through ground to the mid terminal of winding 18. It follows that when relay ER is picked up closing front contacts 14 and 15, the commercial power line is connected to the primary winding 11 of transformer T2 and the filaments of the tubes V1 to V5 are heated by alternating current and rectified current is supplied to the anode circuits of the driver tube V1 and the converter tubes V2 and V3.

A secondary winding 21 of the coupling transformer T4 is connected to grid cathode circuits of the converter tubes V2 and V3, the outside terminals of winding 21 being connected across the control grids of the tubes and the mid terminal of winding 21 being connected to the mid terminal of secondary winding 17 of transformer T2 through a biasing unit BU, and which winding 17 supplies current to the filaments of tubes V2 and V3. Consequently, variations of the anode current of the driver tube V1 induces a corresponding alternating voltage in secondary winding 21 and such voltage is applied to the control grids of the converter tubes to alternately drive the potentials of the grids of these tubes in the positive direction with respect to the filaments. Such variations of the grid potentials of the converter tubes causes corresponding variations in the anode circuit currents of those tubes with the result that an alternating electromotive force is induced in a secondary winding 22 of the output transformer T3.

The driver tube V1 is provided with a grid cathode circuit which includes secondary winding 25 of an input transformer T5 and biasing unit BU as will be apparent from an inspection of the drawing. Thus, control voltages created in secondary winding 25 of the input transformer T5 are effective to create a corresponding electromotive force in secondary winding 22 of the output transformer T3.

A secondary winding 23 of the power transformer T2 is connected across the biasing unit BU through a full wave rectifier 24 with the result a biasing voltage is created across the biasing unit BU. The parts are so proportioned and the connections are so arranged that the voltage created across the biasing unit BU biases the driver tube V1 and the converter tubes V2 and V3 to substantially cutoff.

The control grid circuit for the driver tube V1 is governed by the tuned alternator TA in a manner to appear hereinafter. The tuned alternator TA may be of any one of several known structures for such devices and as here shown is of a vibrating reed type having a vibrating contact member 38 which is vibrated at the predetermined rate when power is supplied to an operating winding 40. The manner by which the tuned alternator TA controls the driver tube V1 and the manner in which the tuned alternator converts direct current from battery EB into alternating current will appear when the operation of the apparatus is described.

A portion of the output energy developed in secondary winding 22 of the output transformer T3 is applied to a power-off relay POR through an adjustable resistor 26, a transformer T6 and a rectifier 27. A load resistor R6 is connected across secondary winding 22 of the output transformer through back contact 29 of the power-off relay POR, but when relay POR is picked up the winding 22 is switched to a primary winding 30 of the track transformer T1.

The relays TRA and COR are controlled by traffic in advance of the section D—E. Relay COR is energized and picked up in response to code operation of the track relay TRE for the section in advance, the relay COR being supplied with energy through a decoding transformer TE in the well-known manner. The relay TRA is an auxiliary direct current track relay that is often provided with coded track circuits when non-coded current is to be supplied to the track circuit in response to a given traffic condition. The relay TRA is connected across the rails when the regular track relay TRE is not following code and the relay COR is released closing back contact 8, the relay TRA being energized and picked up in response to a non-coded direct current supplied to the rails by means not shown.

In describing the operation of the apparatus, I shall first consider the normal condition, that is, the condition when no train occupies the section D—E or is approaching thereto. In the normal condition, the approach controlled relay VM is energized opening its back contact 32 to disconnect the control relay ER and the tuned alternator TA from the battery EB. With relay ER deenergized, the power line PL is disconnected from the unit EC and the tubes of the unit are cold and without power. The coder CTM is continuously active to code the direct current from the track battery 2 so that the track relay TR is operated at code.

I shall next consider that a train traveling in the normal direction of traffic approaches the section D—E when the traffic controlled relays TRA and COR, responsive to traffic conditions in advance, are both energized, or at least one or the other is energized. The train approaching the section causes the approach controlled relay VM to be released, relay VM being approach controlled in accordance with any one of the several well known arrangements. With relay VM released, closing back contact 32, current flows from terminal B of the battery EB through either front contact 33 of relay COR or back contact 34 of relay COR and front contact 35 of relay TRA, wire 36, winding of relay ER, wire 37 and back contact 32 of relay VM to terminal C of the battery EB, and the relay ER is picked up to connect the power line to primary winding 11 of transformer T2 of the frequency converter unit EC. This results in the filaments of the several tubes of the unit EC being heated and rectified current being applied to the anode circuits of the driver tube V1 and of the converter tubes V2 and V3. Also, the bias voltage is built up on the unit BU to bias the tubes V1, V2 and V3 to substantially cutoff. Furthermore, the tuned alternator TA is now supplied with current from battery EB, current flowing from terminal B through the contact member 38 of the tuned alternator, contact 39, operating winding 40, wire 37, and back contact 32 of relay VM to terminal C. The vibrating contact member 38 is vibrated at a rate predetermined by the proportioning of the parts of the tuned alternator TA.

Each on code period of the coder CTM to close its contact 41, the grid circuit of driver tube V1 is excited by the voltage drop across the operating winding 40 of the tuned alternator, a primary winding 28 of transformer T5 being connected across operating winding 40 through an adjustable resistor R1 and current limiting resistor R2. The secondary winding 25 of transformer T5 is preferably shunted by a capacitor 42 for wave form correction. The variations created in the anode circuit of tube V1 due to the excitation of the control grid of the tube from the tuned alternator serves to excite the converter tubes V2 and V3 to produce in winding 22 of the output transformer T3 an alternating voltage of a frequency determined by the rate of operation of the tuned alternator TA. That is to say, the tuned alternator TA is proportioned as to its rate of operation so as to govern the frequency converter unit EC to cause an alternating voltage of a special frequency to appear in the secondary winding 22 of the output transformer T3, and which frequency I have assumed to be 100 cycles per second, although other frequencies can be used. A portion of this voltage created in winding 22 is rectified and used to energize the power-off relay POR. It is to be observed that resistor R6 serves as a load on winding 22 previous to the picking up of the power-off relay POR, resistor R6 being proportioned to create a load approximately equivalent to that of the track circuit when a train occupies section D—E at the entrance end thereof. If the voltage across the load resistor R6 is normal proving that the apparatus is working properly, the power-off relay POR is energized sufficiently to pick up and in so doing switches the winding 22 from the load resistor R6 to primary winding 30 of the track transformer T1. This results in a corresponding alternating voltage being induced in secondary winding 9 of track transformer T1 and alternating current superimposed on the track circuit. This alternating current is coded at contact 10 of the coder CTM and is available to govern cab signals of the train as it traverses section D—E.

It is to be pointed out that the input of the frequency converter EC is coded at contact 41 of the coder CTM and the output of the frequency converter to the track circuit is also coded at contact 10 of the coder and the power consumed minimized. It is apparent that one of the coding contacts can be omitted.

When the train passes beyond the section and the approach controlled relay VM is reenergized, the apparatus is restored to its normal condition.

I shall next consider the condition when a loss of power occurs on the power line PL. When a train approaches the section and the approach controlled relay VM is deenergized, the tuned alternator is set into operation the same as before, but the frequency converter EC remains deenergized with the result the power-off relay POR remains released. Current flows now from terminal B of the battery EB through vibrating contact member 38 of the tuned alternator, contact 44 when the contact member 38 swings to the left, wire 45, lower portion of a primary winding 46 of track transformer T1, back contact 47 of relay POR, either front contact 48 of relay COR or front contact 49 of relay TRA and back contact 50 of relay COR, and to terminal C of the battery EB. When contact member 38 of the tuned alternator swings to the right, current flows through contact 51 of the tuned alternator, wire 52, top portion of winding 46 of the track transformer T1 and as previously traced to terminal C. This alternate energizing of the two portions of winding 46 of the track transformer T1 induces an alternating voltage in the secondary winding 9 and alternating current is supplied to the track circuit, this alternating current being of a frequency of 100 cycles per second, since it is determined by the operating frequency of the tuned alternator.

An indicator lamp 60 is illuminated by an obvious circuit including front contact 61 of the power-off relay POR. The lamp 60 may be located outside of the usual instrument case used for housing the apparatus and in a location where it may be seen by a maintainer. The illumination of the lamp 60 would indicate to the maintainer that the apparatus is powered from the power line and is operating properly. If the lamp 60 remains dark while a train is passing through the section, the maintainer would know that there is either a loss of power on the power line or the apparatus has failed.

When a maintainer opens the door of the instrument case in which the apparatus is housed, the door switches D1 and D2 are moved to open their front contacts 12 and 13, respectively, and the high voltage from the power line is removed from the apparatus. Also the closing of contacts 55 and 56 of the door switches D1 and D2, respectively, serves to discharge filter capacitor C2 connected to the anode circuits of the tubes V1, V2 and V3 to by-pass the ripples of the rectified current. The capacitor C2 is discharged through a relatively low resistor R5 when either contact 55 or 56 is closed. Furthermore, if the normally closed contacts 12 and 13 of the door switches fail to open when the door is removed, then the anode circuits of the tubes V1, V2 and V3 are short circuited through the contacts 55 and 56 and a fuse 57 interposed in the anode circuits would be blown and remove the high voltage of the output of the rectifiers from the apparatus to protect the maintainer.

Apparatus here disclosed has the advantages of using an electronic frequency converter which is excited from the operating winding of an associated tuned alternator and contacts of the tuned alternator are used only during periods when the power is supplied from a stand-by battery. The electron tubes of the frequency converter are completely approach controlled so that the power consumed during normal conditions is reduced to a minimum. All tubes are alike to facilitate maintenance. Greater efficiency is obtained by biasing the tubes to cutoff and by coding both the input circuit and the output circuit of the frequency converter. Safety to the maintainer against contact with relatively high voltage circuits is obtained. Also, an indication is provided by which a maintainer knows if the power is being provided from the usual commercial power line and, if the frequency converter apparatus is functioning properly, without opening the instrument case in which the apparatus is housed.

Although I have herein shown and described only one form of track circuit apparatus embodying my invention, it is understood that various changes and modifications may be made therein within the scope of the appended claims without departing from the spirit and scope of my invention.

Having thus described my invention, what I claim is:

1. In combination with a track circuit to which alternating current is to be supplied, a tuned alternator having a member which is vibrated when current is supplied to an operating winding through a contact actuated by said member; an electron tube having an anode, a grid and a cathode; an anode-cathode circuit including a source of unidirectional current for said tube, a grid cathode circuit for said tube having connections across said operating winding of said tuned alternator to vary the current flowing in said anode-cathode circuit at a rate determined by the rate of operation of said tuned alternator, and circuit means coupled to said anode-cathode circuit and having connections to said track circuit to supply an alternating current to the track circuit due to said variations of the current flowing in said anode-cathode circuit.

2. In combination with a track circuit to which alternating current of a special frequency is to be supplied, a tuned alternator having a member which is vibrated when current is supplied to an operating winding through a contact engaging said member; an electron tube having an anode, a grid and a cathode; an anode-cathode circuit including a source of unidirectional current for said tube, a grid cathode circuit for said tube having connections across said operating winding of said tuned alternator to vary the current flowing in said anode-cathode circuit due to the operation of said tuned alternator, circuit means coupled to said anode-cathode circuit and having connections to said track circuit to supply alternating current to the track circuit due to said variations of the current of said anode-cathode circuit, and said tuned alternator adjusted for its rate of operation to provide said special frequency for said alternating track circuit current.

3. In combination with a track circuit to which alternating current is to be supplied, a tuned alternator having a member which is vibrated when current is supplied from a given source to an operating winding through a contact actuated by said member; an electron tube having an anode, a cathode and a control electrode; an anode-cathode circuit including a source of unidirectional current and a winding for said tube, means to couple said control electrode and cathode to said given source through said contact of said tuned alternator to vary the current flowing in said anode-cathode circuit due to the vibration of said member of the tuned alternator, and circuit means to couple said winding of said anode-cathode circuit to said track circuit to supply alternating current to the track circuit due to operation of the tuned alternator.

4. In combination with a track circuit to which alternating current is to be supplied, a tuned alternator having a member which is vibrated when current is supplied to an operating winding through a contact actuated by said member; a pair of electron tubes each having an anode, a cathode and a control electrode; an anode-cathode circuit including a source of unidirectional current for each of said tubes, circuit means connected across said operating winding of said tuned alternator and having connections to the control electrode and cathode of each of said tubes to alternately vary the potential of said control electrodes with respect to the cathodes in response to operation of said tuned alternator, and other circuit means coupled to said anode-cathode circuits and having connections to said track circuit to supply alternating current to the track circuit in response to the variations created in the currents flowing in said anode-cathode circuits due to said potential variations of said control electrodes.

5. In track circuit apparatus for supplying alternating current to a track circuit of a track section, the combination comprising, a tuned alternator having a member which is vibrated when an operating winding is supplied with current through a contact actuated by said member; an electron tube having an anode, a cathode and a control electrode; an anode-cathode circuit for said tube, an approach controlled relay for said section having a contact which is closed when a train approaches said section, means controlled by said relay contact to supply current to said tuned alternator and to said anode-cathode circuit means to connect said control electrode and cathode across said operating winding of said tuned alternator to vary the current flowing in said anode-cathode circuit due to the operation of said tuned alternator, and other circuit means to couple said anode-cathode circuit to said track circuit to supply alternating current to the track circuit in response to said variations of the current flowing in said anode-cathode circuit.

6. In track circuit apparatus for supplying alternating current to a track circuit of a track section, the combination comprising, a tuned alternator having a member which is vibrated when current is supplied to an operating winding through a contact actuated by said member; an electron tube having an anode, a control electrode and a heater element which may serve as a cathode; an approach controlled relay having a contact which is normally open and closed when a train approaches said section; means including said relay contact to supply current to said tuned alternator winding, to said heater element and to said anode-cathode circuit; means to couple said control electrode and cathode across said tuned alternator winding to vary the current flowing in said anode-cathode circuit in step with vibration of said member of the tuned alternator, and a transformer having one winding interposed in said anode-cathode circuit and another winding coupled to said track circuit to supply alternating current to the track circuit in response to said variations of the current flowing in the anode-cathode circuit.

7. In combination with a track section formed with a track circuit to which alternating current of a special frequency is to be supplied, a source of alternating current of commercial frequency which is different from said special frequency, a tuned alternator having a member which is vibrated when current is supplied to an operating winding through a contact actuated by said member; an electron tube having an anode, a cathode and a control electrode; means including a rectifier to connect said source of alternating current to an anode-cathode circuit for said tube, means to connect said control electrode and cathode of the tube across said operating winding of the tuned alternator to vary the current flowing in said anode-cathode circuit in step with vibrations of said member of the tuned alternator, a transformer having one winding interposed in said anode-cathode circuit and another winding coupled to said track circuit to supply alternating current to the track circuit in response to said variations of the current in the anode cathode circuit, and said tuned alternator disposed as to the rate of vibration of its member for said alternating current supplied to the track circuit to be of said special frequency.

8. In combination with a track section formed with a track circuit to which alternating current of a special frequency is to be supplied, a source of alternating current of a frequency which is different from said special frequency; a frequency converter means including a pair of electron tubes, a rectifier and a transformer; each of said electron tubes having an anode, a cathode and a control electrode; means including said rectifier to connect said source of alternating current to the anode and cathode of each of said tubes, a tuned alternator having a member which is vibrated when current is supplied to an operating winding through a contact actuated by said member, a control electrode cathode circuit for each of said tubes coupled to said operating winding of said tuned alternator to vary the current flowing in the anode-cathode circuit of each tube, said transformer having a half portion of its primary winding interposed in each of said anode-cathode circuits to induce an alternating voltage in its secondary winding due to said variations of the currents flowing in the anode-cathode circuits, said secondary winding coupled to said track circuit to supply alternating current thereto in response to said induced alternating voltage, and said tuned alternator proportioned to vibrate its member at a rate such that the alternating current supplied to the track circuit is of said special frequency.

9. In combination with a track section formed with a track circuit to which alternating current of a special frequency is to be supplied, a source of alternating current of a frequency which is different from said special frequency; a frequency converter means including a pair of electron tubes, a rectifier and a first and a second transformer; each of said tubes having an anode, a control electrode and a filament; a relay having a contact which is normally open and closed when a train approaches said section, a tuned alternator having a member which is vibrated when an operating winding is supplied with current through a contact actuated by said member, a first circuit means made effective by said relay contact when closed to connect said alternating current source to said filaments, a second circuit means including said rectifier made effective by said relay contact when closed to connect said alternating current source across the anode and filament of each of said tubes, a third circuit means made effective by said relay contact when closed to supply current to said operating winding of said tuned alternator, a fourth circuit means including said first transformer to electrically couple the control electrodes and filaments of said tubes to the operating winding of said tuned alternator to alternately vary the currents flowing in the anode filament circuits of said tubes in step with the vibration of said member, a fifth circuit means including said second transformer to couple said anode filament circuits to said track circuit to supply alternating current to the track circuit due to said current variations of the anode filament circuits, and said tuned alternator to vibrate its member at a rate to cause said alternating track circuit current to be of said special frequency.

10. In combination with a track section formed with a track circuit to which alternating current of a special frequency is to be supplied, a source of alternating current of a frequency different from said special frequency, a driver and a pair of converter tubes; each of said tubes having an anode, a control electrode and a filament; a rectifier, a tuned alternator having a member which is vibrated when current is supplied to an operating winding through a contact actuated by said member, a relay having a contact which is closed when a train approaches and occupies said section; circuit means controlled by said relay contact when closed to connect said alternating current source to the filaments of said tubes, to connect said alternating current source through said rectifier to anode filament circuits one for each of said tubes and to supply current to said operating winding of said tuned alternator; means to couple the control electrode and filament of said driver tube across said operating winding of said tuned alternator, a coupling transformer having a primary winding interposed in the anode filament circuit of said driver tube and a secondary winding having half portions interposed in a control electrode filament circuit of each of said converter tubes, an output transformer having half portions of a primary winding interposed in an anode filament circuit of each of said converter tubes and a secondary winding coupled to said track circuit whereby an alternating current of said special frequency is supplied to said track circuit in response to power taken from said alternating current source when said tuned alternator is proportioned to vibrate its member at a predetermined rate.

11. In combination with a track section formed with a track circuit to which alternating current of a special frequency is to be supplied, a source of alternating current of a frequency different from said special frequency, a stand-by battery, a tuned alternator having a member which is vibrated when an operating winding is supplied with current through a contact actuated by said member, said alternator having a pair of contacts which are alternately engaged by said member when vibrated, a pair of electron tubes, means including a rectifier to connect said alternating current source to anode circuits one for each of said tubes, means to electrically couple a control electrode of each of said tubes to said operating winding of said alternator to vary the current flowing in said anode circuits in step with the vibration of said member of the alternator, an output transformer having half portions of a primary winding interposed in said anode circuits to induce an alternating voltage in a secondary winding in response to said variations of the anode circuit currents, a track transformer having a secondary winding connected to said track circuit, a power-off relay receiving power from said secondary winding of said output transformer, means including a front contact of said relay to connect a first primary winding of said track transformer to said secondary winding of said output transformer to supply alternating current to the track circuit due to said induced alternating voltage, means including a back contact of said relay and said pair of contacts of said alternator to connect a second primary winding of said track transformer to said battery to supply alternating current to the track circuit due to the operation of said alternator, and said alternator proportioned to vibrate its member at a rate predetermined to cause the alternating track circuit current to be of said special frequency.

12. In combination, a source of alternating current, a battery, a tuned alternator having a member which is vibrated when current is supplied to an operating winding through a contact actuated by said member, said alternator being provided with a pair of contacts which are alternately engaged by said member when vibrated, a pair of electron tubes, a first transformer and an output transformer, means including a rectifier and a half portion of a primary winding of said output transformer to connect said source of alternating current to an anode-cathode circuit of each of said tubes, a grid cathode circuit including a half portion of a secondary winding of said first transformer for each of said tubes, means to electrically couple a primary winding of said first transformer to said operating winding of the alternator to alternately vary the anode currents of said tubes in step with operation of said alternator, a power-off relay receiving energy from a secondary winding of said output transformer, another transformer having a secondary winding connected to a load circuit, a first primary winding of said another transformer receiving energy from said secondary winding of the output transformer through a front contact of said relay to supply alternating current of a special frequency to said load circuit by energy derived from said source of alternating current, and means including a back contact of said relay to connect a second primary winding of said another transformer to said battery through said pair of contacts of the alternator to supply alternating current of said special frequency to said load circuit by energy derived from said battery.

13. In combination with a track section formed with a track circuit to which alternating current is to be supplied, a tuned alternator, a pair of electron tubes, an output transformer, an anode-cathode circuit for each of said tubes including a source of unidirectional current and a half portion of a primary winding of said transformer, another transformer, a control grid circuit for each of said tubes including a half portion of a secondary winding of said another transformer, means to couple a primary winding of said another transformer to said tuned alternator to alternately vary the potential of the grids of said tubes with respect to the cathode due to operation of the tuned alternator, and thereby induce an alternating voltage in a secondary winding of said output transformer, a power-off relay receiving power from said secondary winding of the output transformer, a load resistor connected across said secondary winding of the output transformer through a back contact of said relay, said load resistor and power-off relay proportioned to pick up the relay only when the voltage induced in the secondary winding of the output transformer is sufficient to effectively energize the track circuit, and means including a front contact of said relay to couple the secondary winding of the output transformer to said track circuit.

CARL VOLZ.

REFERENCES CITED

The following references are of record in the file of this patent:

UNITED STATES PATENTS

| Number | Name | Date |
| --- | --- | --- |
| 1,882,265 | Valley | Oct. 11, 1932 |
| 2,098,040 | Hoppe | Nov. 2, 1937 |
| 2,266,898 | O'Hagan | Dec. 23, 1941 |
| 2,281,957 | Shields | May 5, 1942 |
| 2,408,213 | Huber | Sept. 24, 1946 |

FOREIGN PATENTS

| Number | Country | Date |
| --- | --- | --- |
| 240,954 | Great Britain | Oct. 15, 1925 |